Figure 4:
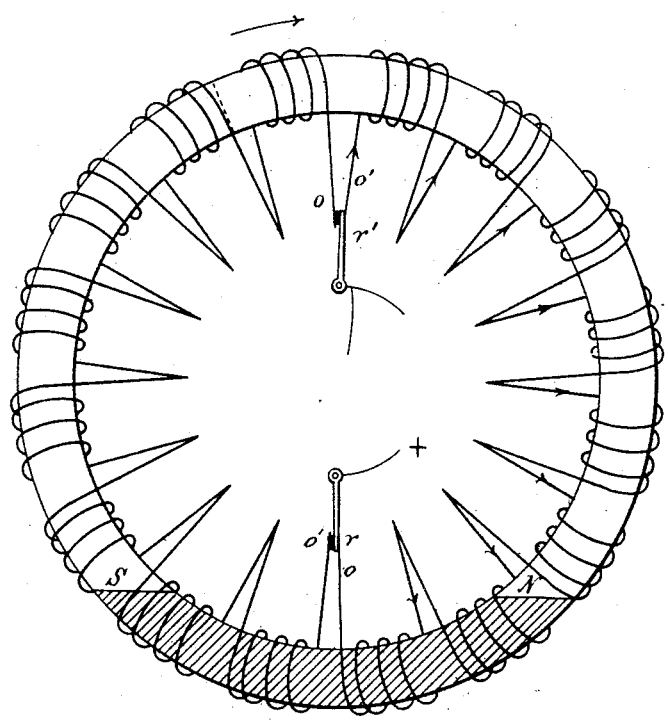

(No Model.)
2 Sheets—Sheet 1.
E. W. SIEMENS.
DYNAMO ELECTRIC MACHINE.
No. 264,780.  Patented Sept. 19, 1882.
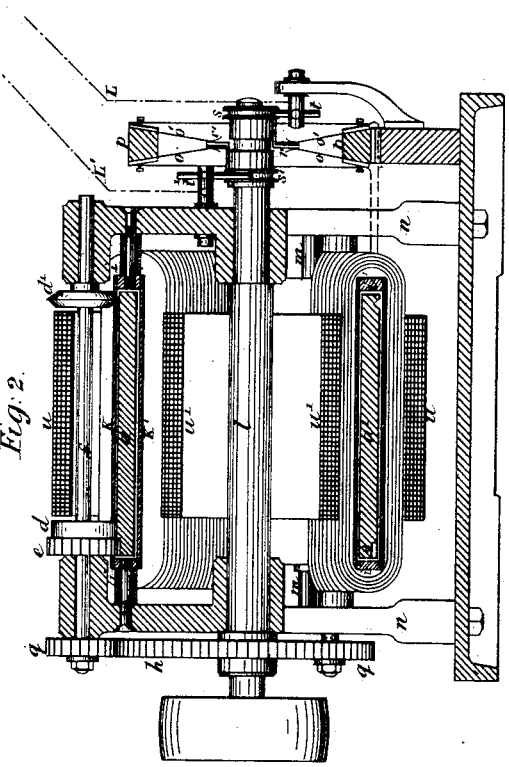
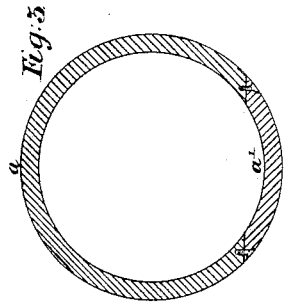
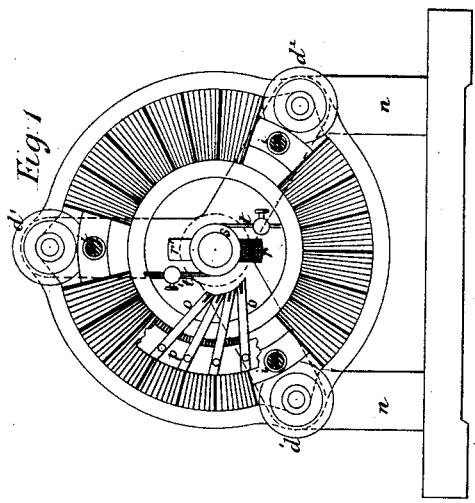
Witnesses
Edward H. Downs
J. W. Reynolds
Ernst-Werner Siemens
by Charles S. Whitman
attorney (No Model.) 2 Sheets—Sheet 2.

E. W. SIEMENS.
DYNAMO ELECTRIC MACHINE.

No. 264,780. Patented Sept. 19, 1882.

UNITED STATES PATENT OFFICE.

ERNST WERNER SIEMENS, OF BERLIN, GERMANY, ASSIGNOR TO SIEMENS BROTHERS & COMPANY, (LIMITED,) OF WESTMINSTER, ENGLAND.

DYNAMO-ELECTRIC MACHINE.

SPECIFICATION forming part of Letters Patent No. 264,780, dated September 19, 1882.

Application filed March 14, 1882. (No model.) Patented in England February 16, 1882, No. 760.

*To all whom it may concern:*

Be it known that I, ERNST WERNER SIEMENS, a subject of the Emperor of Germany, residing at Berlin, in the German Empire, have invented a new and useful Improved Dynamo-Electric or Electro-Dynamic Machine, (for which I have obtained provisional protection in Great Britain, dated February 16th, 1882, No. 760,) of which the following is a specification.

My invention relates to the construction and arrangement of a machine which can be used as a dynamo-electric machine for converting motive power into electricity, or as an electro-dynamic machine for converting electricity into motive power. A peculiar feature of the machine is that the same coils of insulated wire serve both for the induction of electrical currents and also for induction of magnetism.

The machine consists essentially of an iron cylinder, a longitudinal segment of which has been cut out, rotating between concentric wire bobbins. The segment may be replaced by any non-magnetic metal, so that the machine has a complete cylinder. To prevent friction between the cylinder and the wire bobbins the cylinder is kept in a central position by six friction-rollers, so that it can rotate freely between the bobbins. The rotation of the cylinder is effected by the toothed wheel at one of its ends and pinions. By the commutator, part of the wire bobbins at one end of the ring are inserted in the circuit, while the circuit through the other bobbins is interrupted in one or more places. This is done by inserting into the circuit each bobbin as it passes the middle of the non-magnetic segment of the cylinder.

The principal improvement in this machine, when considered as a motor, is that the same current which produces the magnetism produces also the motion. Thereby the length of wire or the internal resistance of the machine is not only reduced to about one-half, but the mutual weakening is also avoided which exists in all machines with two magnetic systems and causes great disturbances and loss of power. Some of the further advantages of the machine are that the rotating motion permits of the relative speed of the parts of the machine attracting each other being increased considerably, and on it depends directly the useful effect of the machine; that the cylindrical form of the moving mass of iron permits of the most favorable effect of the mutual attraction between spirals and iron, and that the deleterious sparking of other machines is almost done away with by the manner of the commutation.

The apparent disadvantage of my machine—that at one time only one-third of the bobbins are active, while the rest are without current—may be disregarded, for the work done by a dynamo-machine is limited by the amount of heating of its wires, and it is the same whether this heating is caused by continuous currents of weak intensity or periodical currents of greater strength. As stated above, no special current or part of a current is used for producing the primary magnetism, because this is a sort of extra work of the attracting current. Consequently this machine combines the advantages of a magneto-electric machine, where the magnetism exists in the permanent (steel) magnets, with those of a dynamo-machine. These are principally that electro-magnetism is stronger than steel magnetism, rendering the volume of dynamo-machines of equal power much less than that of magneto-machines.

The use of these machines as dynamo-electrical machines—viz., current-generating machine—without the use of permanent magnets follows from the theory first stated by me before the Berlin Academy of Science, January 17, 1867. In that paper, in which I also proposed the now generally-adopted nomenclature of "dynamo-electric" and "electro-dynamic" machines, I proved that every correctly-constructed electrical motor must increase the current sent through it when it is turned by an external force in the opposite direction; that any variation in the external current will not produce sparking at the commutator, because there is only one magnetizing-circuit.

Figure 1 of the accompanying drawings is an end view, and Fig. 2 is a longitudinal section, of a machine according to my invention. Fig. 3 is a transverse section of the iron cylinder which operates in the machine as a magnet.

Two end frames, *n n*, fixed on a base, have bearings for a central shaft, *l*, and also for three shafts, *f*. Six bolts or screws, *m*, surrounded by short pieces of tube, secure to the frames $n$ two rings, $i\ i$, of non-conducting material—such as ebonite. To these rings are fixed an outer cylindrical shell, $k$, of sheet-brass or other non-magnetic metal, and a similar inner shell, $k'$, these two shells and the end rings to which they are fixed forming together a hollow annular casing, within which revolves the cylindrical magnet $a$. This magnet, as shown in Fig. 3, consists of a plate of iron bent round in cylindrical form, leaving about one-fourth of the circumference open, and this arc is filled in with a segment, $a'$, of brass or other non-magnetic metal, fixed to the iron and completing the hollow cylinder.

Instead of bending the iron $a$ in one piece, it may consist of several thicknesses or of several lengths joined end to end. The hollow cylinder thus formed is of such size as nearly to fit but to revolve freely within the casing inclosed by the shells $k\ k'$ and the end rings, $i$. It is maintained in position within the casing by three rollers, $d$, on the shafts $f$ bearing against its periphery near one end, and other three rollers, $d'$, on the same shafts $f$ bearing against its periphery near its other end. To prevent end movement of the cylinder, the rollers $d'$ are V-shaped and enter a V-groove in the cylinder. The cylinder is caused to revolve uniformly with the central shaft, $l$, in the following manner: On the shaft $l$ is fixed a toothed wheel, $h$, which gears with pinions $q$ on the shafts $f$, and pinions $e$ on these shafts gear with teeth formed at one end of the cylinder $a$. The edges of the rollers $d\ d'$ and of the pinions $e$ pass through slits in the outer shell, $k$. Around the shells $k\ k'$ are wound lengthwise a numer of coils of insulated wire. A convenient number of such coils, as shown in Fig. 1, is eighteen, being six coils in each of the three divisions of the circumference between the three blank spaces left for the rollers $d\ d'$, pinions $e$, and screws $m$, that fix the annular casing on which the coils are wound. The number of coils might be varied; but for the following explanation I will assume eighteen to be the number, as shown. The wire of each of the coils has two ends; consequently there are thirty-six wires, connected in the following manner: A ring, $p$, of non-conducting material, has fixed on each of its sloping sides eighteen springs—$o$ on the one side, and $o'$ on the other. These springs may extend inward radially; but it is preferred to incline them, as shown in Fig. 1, forward in the direction of rotation of the shaft $l$. The springs $o$ on the one side of the ring $p$ and the springs $o'$ on the other side of $p$ incline toward each other, so that each spring $o$ meets a spring, $o'$, and the meetings of all the eighteen pairs of springs are in a plane perpendicular to the axis of the machine. One end of the wire of each coil is connected to one of the springs $o$ and the other end of the same wire is connected to one of the springs $o'$—not to that which meets the former, but to the spring next in order, so that the outgoing end of each coil becomes connected, through the meeting of a pair of springs, $o$ and $o'$, with the ingoing end of the coil next in order, and if all the eighteen springs $o$ were simultaneously in contact with the eighteen springs $o'$ there would be a closed circuit including all the eighteen coils following in order.

On the shaft $l$ there are fixed two knives or separators, $r$ and $r'$, which, as the shaft revolves, pass between the pairs of springs $o$ and $o'$, separating each pair successively. The knife $r$ has on one side a metal face, and on the other side a facing of non-conducting material, such as ivory; and the knife $r'$ has a like facing on the side opposite to that of $r$, so that while the knife $r$ is separating a pair of the springs it makes electrical contact only with one of those marked $o$, and while the knife $r'$ separates a pair of springs it makes contact with one of those marked $o'$. The knife $r$ is connected to a ring, $s$, fixed insulated on the shaft $l$, and the knife $r'$ is connected to a similar ring, $s'$, and against these rings respectively rub brushes $t$ and $t'$, which make connection to the wires L L' of the external circuit.

When the machine is employed dynamo-electrically, by causing the shaft $l$ to rotate the action is as follows: The iron cylinder $a$, having certain residuary magnetism, in revolving through the coils induces in them electrical currents, and the currents so induced react on the cylinder, increasing its magnetism until the machine reaches the limit of its power. The circuit of the coils being broken at successive points by the knives $r\ r'$ separating the successive springs, through the contact of which if maintained that circuit would be closed, the currents induced in the coils are directed by the knives $r\ r'$, the rings $s\ s'$, and the brushes $t\ t'$ into the external circuit, L L'. The course of the currents may be understood by referring to the diagram Fig. 4, in which the two knives $r\ r'$ are shown in the act of separating each pair of the springs $o\ o'$. The coils on the left-hand half of the figure are cut out of the circuit by the insulating-pieces on the knives $r\ r'$, while the coils on the right have currents induced in them which are conveyed through the conducting sides of the knives in a complete circuit from — to +. Conversely, when electricity is transmitted to the machine by the line-wires L L' currents are by the action of the knives $r\ r'$ passed successively through the coils, so as to cause the cylinder $a$ to rotate and drive the shaft $l$, the machine then operating as an electro-dynamic machine. The power of the machine for either use may be increased by an external shell, $u$, of iron encircling all the coils, and by an internal shell, $u'$, of iron inside the coils. These shells or either of them may consist of convolutions of iron wire.

It is sometimes desirable to make the machine reversible, so that the shaft may revolve in either direction. In that case each of the knives r r', instead of having one side of non-conducting material, may have both sides metal separated by insulating material between them, and two additional rings, such as s s', are provided with these brushes, one side of each knife being connected to a ring corresponding with s and the other side to a ring corresponding to s'.

By connecting one pair of the brushes t t' to the external circuit the machine is set to revolve in the one direction; but by disconnecting these brushes from the circuit and connecting the other pair to it the machine is set for revolution in the opposite direction.

Having thus described the nature of my invention and the best means I know of carrying it out in practice, I claim—

1. A dynamo-electric or electro-dynamic machine wherein a magnet formed as a segment of a hollow iron cylinder revolves within a number of stationary coils which have their wires connected to one another through pairs of contact-springs, and successively to an external circuit by revolving knives which separate these pairs of springs, substantially as and for the purposes set forth.

2. In a dynamo-electric or electro-dynamic machine, the combination of the shaft l and its toothed wheel h with the shafts f, the rollers d d' and pinions e thereon, and the cylinder a, with its groove for the rollers d', and its teeth for the pinions e, substantially as and for the purposes set forth.

3. In a dynamo-electric or electro-dynamic machine, the combination of the coil-wires with the insulated springs o o', the knives r r', the insulated rings s s', and their brushes t t', connected to the external circuit, substantially as and for the purpose set forth.

In testimony whereof I have signed my name to this specification, in the presence of two subscribing witnesses, this 20th day of February, A. D. 1882.

ERNST WERNER SIEMENS.

Witnesses:
 CARL FRISCHMAN,
 FRIEDRICH VON HEFNER-ALTENECK.